(12) United States Patent
Howden et al.

(10) Patent No.: US 6,227,354 B1
(45) Date of Patent: May 8, 2001

(54) CONVEYOR SHAFT SUPPORT ASSEMBLY

(75) Inventors: Kevin Howden, Abingdon, VA (US); Garland J. Harrington, Piney Flats, TN (US)

(73) Assignee: Longwall-Associates, Inc., Chilhowie, VA (US)

( * ) Notice: Subject to any disclaimer, the term of this patent is extended or adjusted under 35 U.S.C. 154(b) by 0 days.

(21) Appl. No.: 09/330,873

(22) Filed: Jun. 11, 1999

(51) Int. Cl.$^7$ ................................................... B65G 23/06
(52) U.S. Cl. ............................................. 198/834; 198/837
(58) Field of Search .................................. 198/834, 837, 198/841; 403/245, 246, 263

(56) References Cited

U.S. PATENT DOCUMENTS

| | | |
|---|---|---|
| 4,037,713 | 7/1977 | Soliman et al. . |
| 4,953,692 | 9/1990 | Stoppani et al. . |
| 5,074,827 | 12/1991 | Bandy, Jr. . |
| 5,232,068 | 8/1993 | Bandy, Jr. . |
| 5,389,044 | 2/1995 | Bandy, Jr. et al. . |

FOREIGN PATENT DOCUMENTS 2 156 943A  10/1985  (GB) .

Primary Examiner—Janice L. Krizek
(74) Attorney, Agent, or Firm—King & Schickli, PLLC

(57) ABSTRACT

An assembly for supporting the drive or idler shaft in an endless conveyor, such as an armored face or scraper chain conveyor, is provided. The assembly includes a pair of annular bearing housings having central bores for receiving the ends of an idler shaft carrying dual spaced inner, or single twin inboard sprocket rings. Each bearing housing includes a relatively wide integral support arm for insertion into a corresponding C-shaped bracket attached to the end face of the conveyor frame. Fasteners, such as dowel pins and bolts, are inserted into aligned vertical apertures formed in the cooperating support arms and brackets. In the mounted position, the bearing housings fully support the shaft ends independent of the conveyor frame sidewalls and thus are useful with conveyors having sidewalls spaced any distance apart. The independence provided by moving the bearing housings inward permits a shorter and consequently lighter shaft to be used and one that is less prone to deflection. Mounting the ends of the shaft in spaced bearing housings securely held in individual brackets reduces vibration, deflection and damage from shock loading. Positioning the bearings at the ends of the shaft also provides resistance for the twisting forces created by the heavy gauge chains, especially where dual spaced sprockets are present. Caps attached to the outer side of each bearing housing protect the rotating shaft ends and contain any lubricant present in the bores. Passages formed in the housings allow the bearings to be lubricated.

15 Claims, 3 Drawing Sheets

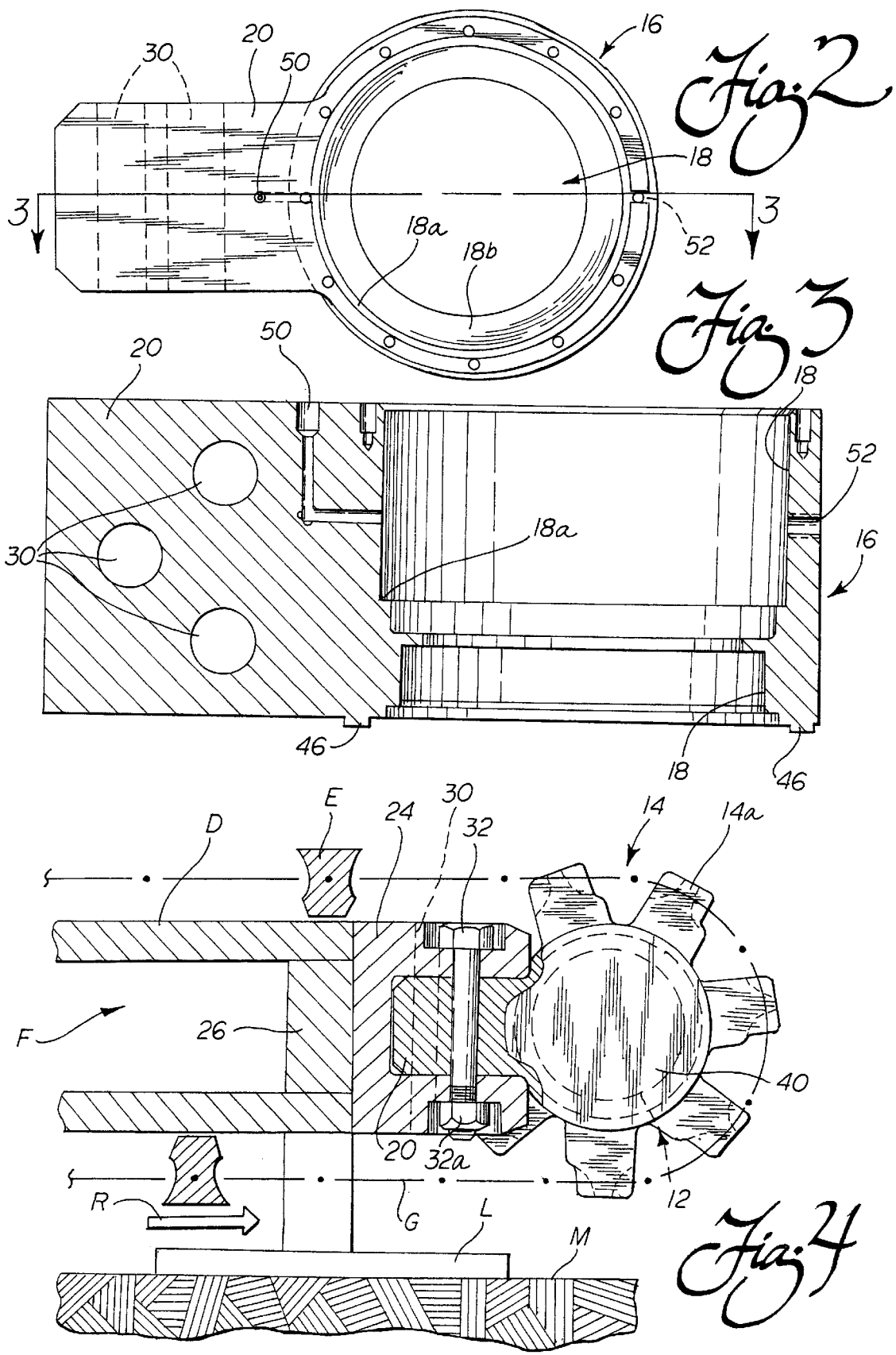

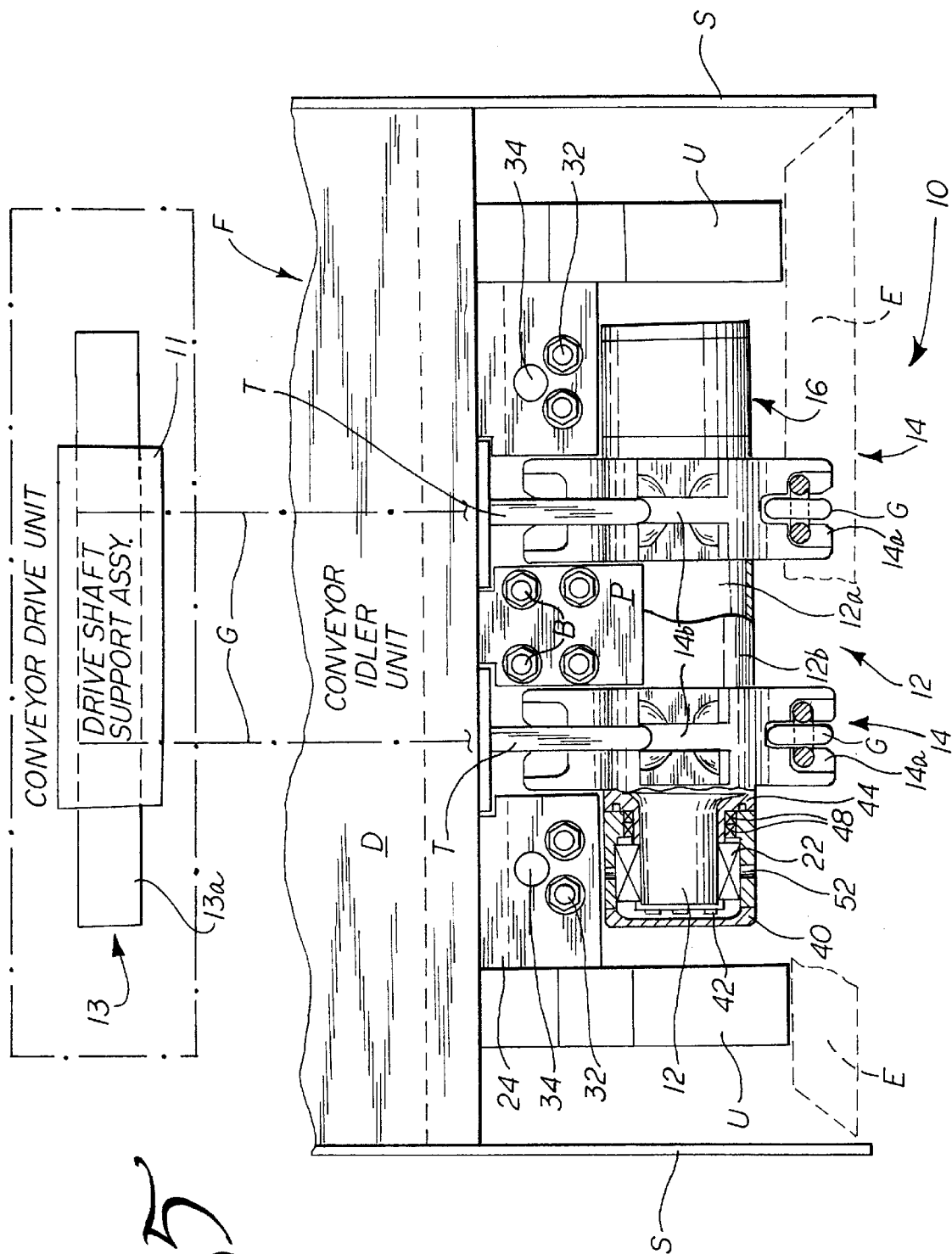

CONVEYOR SHAFT SUPPORT ASSEMBLY

TECHNICAL FIELD

The present invention relates generally to endless conveyors used to haul aggregate materials and, more particularly, to an improved assembly for supporting a conveyor drive or idler shaft independent of the sidewalls of the conveyor frame.

BACKGROUND OF THE INVENTION

In the underground mining of coal or other minerals, endless conveyor systems are used to transport the mined aggregate material won from the mine face to the surface for washing, dewatering, or other types of processing before it is ready for use. One type of conveyor commonly used is known as a stage loader. As well known in the art, the stage loader is a type of scraper chain conveyor that receives coal from an armored face conveyor as a part of a longwall mining machine and loads it onto a takeaway conveyor which eventually transports the coal to the surface. The scraper chain conveyor includes an upper deck supported by spaced sidewalls that define a feed path. To move the coal along this feed path, one or more heavy gauge chains are connected to pull a series of flight bars along the conveyor. A driven shaft having at least one sprocket is mounted at one end of the conveyor to drive the chain(s) and an idler shaft having a similar sprocket(s) is provided at the opposite end. Both ends of the conveyor include drive or idler support units for the respective shaft. These units typically include spaced support plates that project outwardly from the upper deck at the end of the conveyor frame. These support plates have semi-annular profiles that help in guiding the flight bars as the transition is made from the forward to the return run, or vice versa.

In the past, drive or idler shafts were commonly supported in bearing housings carried directly in the sidewalls of the conveyor frame. An example of one such early proposal is found in U.S. Pat. No. 4,037,713, issued Jul. 26, 1977. This patent discloses a conveyor with spaced apart sidewalls, each having a recess for installing a bearing housing. The housings receive and provide rotational support for the ends of the respective drive or idler shaft.

One significant limitation inherent in this "outboard" arrangement shown in this earlier patent (and others like it) is that access to the bearing housings is restricted. Furthermore, the conveyor frame for either the face conveyor or the stage loader (or other conveyor) is typically placed as close as possible to the mine face or other wall. This conserves space and, for an armored face conveyor, ensures that the coal won from the mine face falls onto the conveyor. This tight spacing further prevents the bearings from being easily reached for servicing on the side of the conveyor next to the face. Instead, the shaft and bearing housings together must be lifted upwardly out of the recesses in the conveyor frame. This is especially difficult in the confines of an underground mine. Such an arrangement makes not only servicing, but also inspection and/or lubricating the bearings extremely difficult and time consuming.

A more recent approach can be found in U.S. Pat. No. 5,232,068, issued Aug. 3, 1993, which discloses a conveyor frame having split sidewalls that contain bearing housings for rotatably supporting the ends of an idler shaft. As can be appreciated, the split sidewalls permit the drive or idler shaft to be more easily removed horizontally from the end of the conveyor, as may be necessary for servicing/repair or replacement. Additionally, a remote lubrication system is proposed to minimize wear on the shaft and lessen the frequency with which the shaft or bearings are replaced.

The '068 patent also provides other features designed to overcome the limitations inherent in the support arrangement disclosed in the '713 patent. However, it should be recognized that the shaft is still fully supported by the side walls of the conveyor frame. This means that the length of the shaft is dictated by the spacing of the sidewalls of the conveyor frame. In other words, because the shaft support is provided by the sidewalls of the conveyor frame, the shaft must be at least as long as the distance between the inner edges of these sidewalls. This not only increases the cost, but also prevents a drive or idler shaft from one conveyor from being interchanged with those used in different types or sizes of conveyors, as the spacing of the sidewalls of the conveyor frame frequently varies. Specialized shafts must be kept on hand for the many different types of armored face or scraper conveyors that may be used at a particular underground mining installation, which is obviously inconvenient and expensive. Moreover, if the shaft is damaged, worn out, or otherwise in need of replacement, significant and costly production downtime may result while a replacement shaft having a suitable length dimension is found or fabricated.

In an effort to overcome these limitations, others have proposed arrangements where the drive or idler shaft is supported by separate bearing housings mounted inside, or "inboard," of the conveyor frame sidewalls. One example of such an arrangement is shown and described in British Patent Specification No. 2,156,943, owned by Fletcher Sutcliffe. In this proposal, spaced bearing housings each include narrow projecting studs inserted in corresponding recesses formed in a face plate of the conveyor frame. By tightening a nut on the threaded end of each stud, the peripheral surfaces of the bearing housings are brought into engagement with the corresponding ends of upper and lower support plates projecting from the conveyor frame. The bearing housings can be spaced apart for supporting the ends of the shaft (FIG. 5), brought inward with the sprockets moved to the ends of the shaft (FIG. 4), or combined in a single center bearing housing (FIG. 6).

While this arrangement avoids the limitations created by supporting the shaft in the spaced sidewalls of the conveyor frame, it has several shortcomings. For example, the single stud mounting is very insecure and prone to failure in the harsh conditions and due to the tremendous forces that scraper chain conveyors are exposed to during normal operation. These forces include large deflection and twisting forces created by the rotation of the shafts as the heavy gauge chains are pulled or guided along by the sprockets. Over time, this tends to weaken or loosen the stud/nut fastener combinations securing the housings in place and could possibly lead to conveyor failure. It should also be appreciated that these fastener combinations are in a difficult place to reach below the upper surface of the conveyor. This complicates any preemptive servicing efforts and requires significant and costly production downtime in the event failure does occur.

The deleterious effects of the twisting forces are especially problematic in the embodiment having dual outer sprockets carried on the ends of the drive or idler shaft (see FIG. 5 of the '943 patent). The coaction of the chains on such spaced sprockets tends to create an uneven loading condition that eventually allows the stud to pivot back and forth in the recess. To resist this twisting force, the '943 reference proposes capturing the respective ends of the shaft in recesses or slots formed in the sidewalls of the conveyor frame. Of course, although this may offer some resistance against the troublesome twisting forces, it again makes the shaft length directly dependent on the spacing of the sidewalls of the conveyor frame.

Expressly recognizing the limitations of the above-described support arrangements, U.S. Pat. No. 4,953,692 to Stoppani et al. proposes a unitary central bearing housing mounted inboard of the conveyor frame sidewalls. Specifically, the '692 bearing housing includes a projecting nose for insertion in a receiving recess formed in the front of the conveyor frame. To seat this nose in the recess, an expansible fastener is inserted vertically through a single set of corresponding apertures extending through the nose and cross member. Once registered in the aligned apertures, expansion of the fastener is supposed to draw the bearing housing into engagement with the upper and lower portions of the cross member and hold it in this position.

Although the housings in this proposal provide support for the shaft independently of the conveyor frame sidewalls, limitations similar to those described above for the Fletcher Sutcliffe proposal remain. For instance, the uneven loading on the shaft created by the chains riding on the dual outer sprockets eventually tends to cause the fastener to loosen, which can allow the nose to pivot in the receiving recess. This back and forth movement over time can destroy the tight seating engagement due to wear on the seating surfaces in the recess, and thus possibly lead to a conveyor failure. Furthermore, the center bearing housing arrangement proposed in this patent would not be suitable for use with drive or idler shafts having inner sprockets.

Accordingly, a need is identified for an assembly for securely and reliably supporting a shaft in an endless conveyor of the scraper chain type that is commonly used to transport aggregate materials in underground coal mining. The assembly would support the shaft independent of the sidewalls that typically form a part of the conveyor frame. This independence would allow for shorter and consequently lighter shafts. Shafts could also be interchanged between conveyors having side walls spaced any distance apart, as long as this distance is greater than the length of the shaft. Additionally, a secure and reliable mounting for the shaft would enhance stability and resist twisting, deflection, and other large forces created as the chain(s) are pulled along or carried by the sprockets of the drive or idler shafts. However, the assembly would also allow the shaft to be easily accessed for maintenance, including dismounting for reversing or replacement, as may be necessary or desirable.

SUMMARY OF THE INVENTION

Therefore, keeping the above needs in mind, it is a primary object of the present invention to provide an assembly for supporting a shaft in an endless conveyor such as an armored face or scraper chain conveyor for hauling aggregate material that overcomes the above-described limitations and shortcomings of prior art arrangements.

Another object of the present invention is to provide a shaft support assembly that provides secure and stable rotational support for the shaft independent of the sidewalls of the conveyor frame, thereby allowing for a shorter shaft to be used that is lighter and more resistant to deflection.

Yet another object of the present invention is to provide a shaft support assembly having a pair of annular bearing housings that fully contain and support the ends of the shaft to resist twisting forces created by the chains being driven or pulled along by sprocket(s) carried on the shaft.

Still a further object of the present invention is to provide a shaft support assembly including a pair of annular bearing housings and a shaft forming a unit that can be easily dismounted for reversing the ends of the shaft in order to increase the service life of the sprockets, or for other types of service, repair, or replacement.

A further object of the present invention is to provide a shaft support assembly that includes a pair of annular bearing housings having central bores receiving and holding bearings that rotatably support each end of the shaft, said housings including removable caps for containing the outer end of each housing to protect the end of the rotating shaft and contain any lubricant present.

Yet another object of the present invention is to provide a shaft support assembly with annular bearing housings that include a passage for allowing lubricant to be introduced to the bearings held in the central bore of the housing, thereby avoiding the need for dismounting the shaft and bearing housings to provide the regular lubrication, and thus minimize wear and maintain operational efficiency.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and according to the purposes of the present invention as described herein, an improved assembly is provided for supporting the drive or idler shaft in an endless conveyor. The endless conveyor can be an armored face conveyor, stage loader, feeder conveyor, or any other similar conveyor apparatus. For purposes of this description, the endless conveyor is a scraper conveyor having at least one heavy gauge chain that pulls flight bars along a feed path to haul aggregate material. At one end of the conventional scraper chain conveyor, a drive shaft carries one or more conveyor drive sprockets for driving the chain(s) along the conveyor feed path of the forward/operative run. The opposite end includes a non-driven idler shaft having a similar number of sprockets for reversing the chain(s) for guiding along the return run back to the drive sprocket(s). These chain(s) pull the flight bars along an upper deck defining the feed path contained on both sides by sidewalls that form a part of the conveyor frame. The following discussion of a preferred embodiment describes the shaft support assembly in use with an idler shaft on a scraper chain conveyor only. However, it should be understood that this description, in its broadest sense, is equally applicable to the driven shaft in a scraper chain conveyor or other similar types of conveyor apparatus.

In the broadest aspects of the invention, the shaft support assembly includes a pair of annular bearing housings having a central bore for receiving the ends of the shaft. A bearing captured in each bore provides the desired rotational support for the shaft. Projecting from each housing is a relatively wide integral support arm. The support arm is adapted to fit closely in and abut with the inner surfaces of the corresponding support brackets. The support brackets are attached to the end face of the conveyor frame, they are kept inside of the sidewalls of the conveyor frame. These support brackets are preferably C-shaped and include upper and lower flanges and a cross web that together define an open yoke. This open yoke is sized to receive the support arm in a close tolerance fit on the top and bottom sides, and thus provide a tight seating engagement that is fully resistant to up and down relative movement. This engagement ensures that the desired full support for the shaft is provided independent of the sidewalls of the conveyor frame. Also, both the support brackets and the corresponding support arms are relatively wide to provide a greater contact surface on the top and bottom. The extra width of the support arms also provides superior resistance to the bending force that results from fully supporting the weight of the rotating shaft in a cantilevered fashion from the end of the conveyor frame.

As should be appreciated, this independent mounting arrangement means that the length of the shaft is not dictated by the spacing of the sidewalls. This allows the shaft to be interchanged between conveyors having different types of frames without regard for the spacing of the sidewalls. The only requirements are that: (1) the shaft is shorter than the space between the sidewalls; and (2) the support brackets are attached to the end face of the frame. Thus, as noted above, the shaft support system of the present invention is readily adaptable to different types of conveyors.

To hold the bearing housing securely in the mounted position projecting from the end face of the conveyor, vertically aligned apertures are formed in both the support arms and the upper and lower flanges of the corresponding brackets. These apertures receive fasteners or securing means, such as bolts/nuts and a dowel pin. Once inserted and registered in the aligned apertures, the fasteners positively secure the support arms in the brackets and ensure that the desired tight seating engagement is maintained. No side to side or up and down movement of the support arms is permitted by this arrangement, even if the shaft is subjected to extreme loading conditions.

Additionally, it should be appreciated that the fasteners extend vertically downward through the aligned apertures, thus making the heads of the fasteners fully accessible from above. This easy access is particularly helpful when removing the shaft from the mounted position is necessary, such as for servicing, repair, or replacement. Another advantage of this easy access is that the shaft and bearing assemblies can be dismounted as a unit and reversed to provide even wear for the teeth on the sprockets. The support brackets are preferably mounted such that the topside of the upper flange is level with the upper deck of the conveyor. The heads of the fasteners are recessed in the upper flange of the support brackets to avoid interfering with the flight bars as they transition from the return to the forward run, or vice versa.

It should now be recognized that once the bolts/dowel pin are registered in the vertically aligned apertures, full and stable support is provided for the bearing housings by the interaction between the brackets and support arms. In the operative position, the bearing housings are cantilevered from the end face of the conveyor frame, but the shaft is contained fully inside the conveyor frame sidewalls. The need for drawing the peripheral surfaces of the bearing housings into engagement with upper and lower support plates is eliminated. This is because full, stable, and secure support is provided for the shaft by the coaction of each of the support arm, bracket, and fastener combination.

Bringing the bearing housings inward from the sidewalls, results in a significant reduction in the shaft length and a concomitant reduction in the weight of the shaft. The provision of a shorter shaft rotatably and fully supported at both ends by annular bearing housings also lessens the deflection loading caused by the tremendous forces typically acting on the drive and idler shafts in scraper chain conveyors, especially when dual inner sprockets are present. The enhanced stability provided by the bearing housings also reduces shaft vibration and the potential for damage from sudden shock loading. Additionally, placing the bearings at the outer ends of the shaft reduces the effects of the deleterious twisting or skewing forces generated by the dual chains as they are pulled along the feed path. Overall, a significant increase in shaft stability, reliability, and performance is realized using the novel shaft support assembly described above.

Caps may also be installed on the ends of the annular bearing housings to provide additional protection for the rotating ends of the shafts and to contain any lubricant introduced to the central bore. A spacer mates with the inner face of the bearing housing to provide containment at the opposite end. Seals positioned adjacent the spacers inside the bore ensure that any lubricant is kept at the most effective location and cannot leak out of the housing.

As should be realized, due to the hostile conditions present, regular and frequent lubrication must be provided for the bearings to minimize wear and maintain optimum operating efficiency. To ease the lubrication process, the annular bearing housings may also include passages for supplying lubricant directly to the bearings captured in the central bore. These passages allow bearing lubrication to be remotely applied, such as set forth in the '068 patent mentioned above. Grease fittings having a check valve can be provided to allow lubrication using a conventional grease gun. In either case, the ends of shaft are fully contained and any lubricant introduced remains in the central bore of the annular bearing housings to ensure effectiveness.

Still other objects of the present invention will become apparent to those skilled in this art from the following description in which there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 2 is a side view of the annular bearing housing for rotatably supporting the shaft;

FIG. 3 is a cross-sectional view of the annular bearing housing along line 3—3 of FIG. 2, illustrating in particular the lubrication passage extending through the medial portion of the support arm to the central bore of the annular bearing housing;

FIG. 4 is a side view looking down line 4—4 of FIG. 1, including a partial cross-sectional view showing the interaction between support bracket and annular bearing housing to provide the desired tight seating engagement, including the vertically aligned apertures and fasteners; the annular bearing housing being supported in a cantilevered position from the end face of the conveyor frame; and FIG. 5 is a top plan view of the idler shaft support assembly of an idler unit of the present invention, with the upper portion of the annular bearing housing at the left side of the assembly cutaway to show detail and the drive unit shown schematically.

Figure 1:
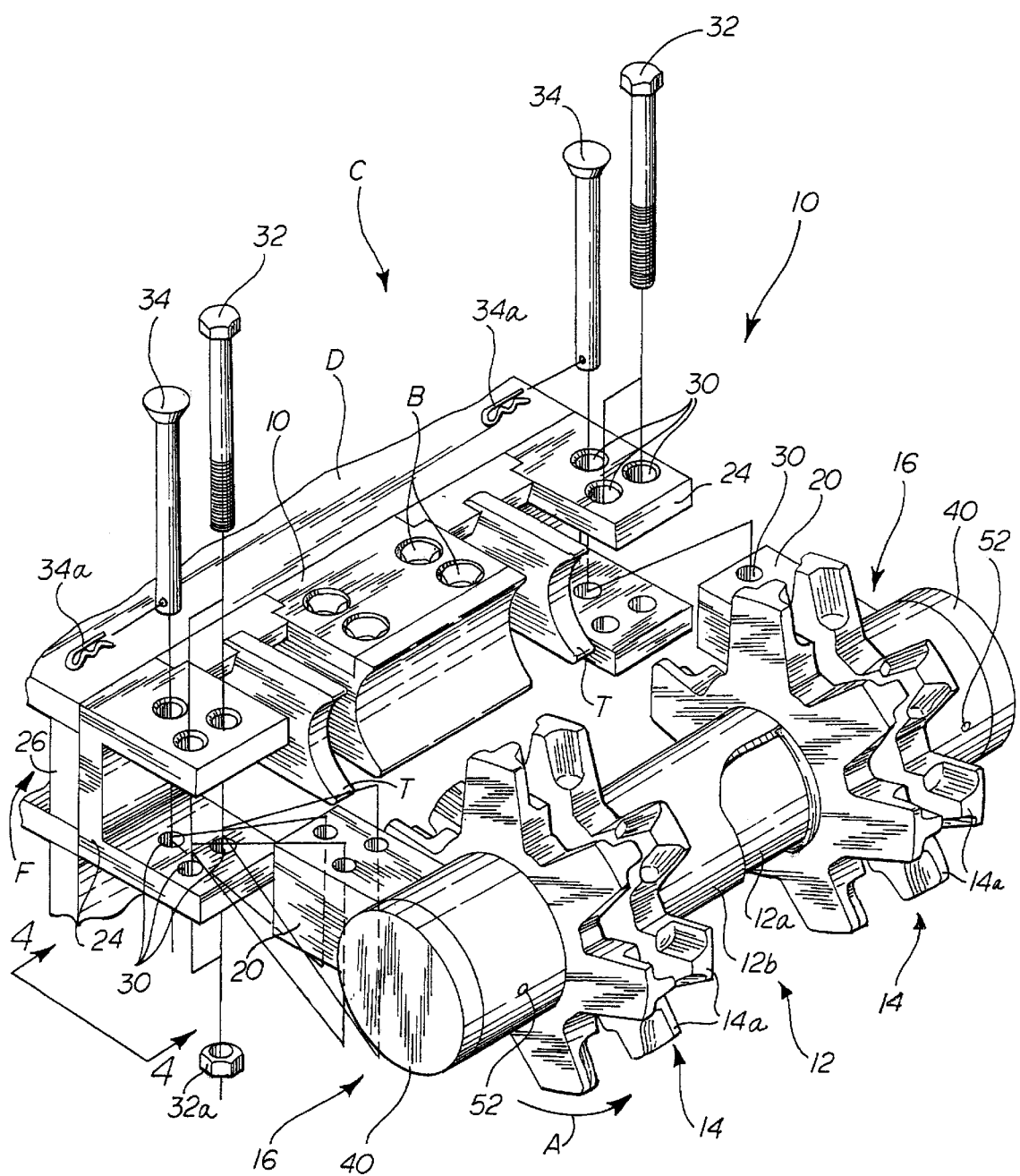
FIG. 1 is a perspective, exploded view of the idler end of the scraper chain conveyor with the sidewalls of the conveyor frame and the support plates removed to show the shaft support assembly of the present invention supporting an idler shaft having dual spaced inner sprockets.

Reference will now be made in detail to the present preferred embodiment of the invention, an example of which is illustrated in the accompanying drawing.

DETAILED DESCRIPTION OF THE INVENTION

Reference is now made to FIG. 1 illustrating an exploded perspective view of a preferred embodiment of the shaft support assembly 10. The assembly 10 is shown in use on the idler unit positioned at one end of an endless scraper chain conveyor C or stage loader, which includes idler shaft assembly 12. As is well known in the art, the opposite end of the conveyor C includes a drive unit shown schematically in FIG. 5 and including a drive shaft support assembly 11 with drive shaft assembly 13 including a drive shaft 13a for driving one or more heavy gauge chains G. Flight bars E connected to these chains G are pulled along the conveyor C to haul aggregate material, such as coal won from the mine face.

At the idler end, dual spaced inner sprockets 14 having a plurality of chain-engaging teeth 14a are carried on the idler shaft 12a of the shaft assembly 12. As should be appreciated, these sprockets 14 serve to guide the chains from the return run (note action arrow R in FIG. 4) below the conveyor frame F to the forward or operative run, or vice versa, depending on the direction in which the chain is being driven.

The conveyor frame F includes spaced sidewalls S that interconnect with and provide support for the upper deck D (see FIG. 5). These sidewalls S also define the conveyor feed path and laterally contain any aggregate material being conveyed. Below the conveyor C, a base L with outboard legs is provided to support the conveyor C on the mine floor M.

Projecting from the end of the conveyor are support plates U, each having an outwardly facing, semi-circular profile to guide the flight bars E as they transition around the end (see dashed line cutaway bar in FIG. 5). In FIG. 1, the sidewalls S and the support plates U are removed to provide a full view of the shaft support assembly 10. As should be appreciated, the drive end of the conveyor C includes a similar arrangement, the difference being that a drive motor is provided for driving the shaft.

As best shown in FIG. 5, the shaft assembly 12 also includes a barrel 12b to provide spacing between the sprockets 14. A curved support projecting from the end of the conveyor frame F includes a removable upper deck extension P to assist the flight bar E in moving onto the upper deck D. As illustrated in FIG. 1, the support has an arcuate face corresponding to the shape of the shaft assembly 12, and more particularly, the barrel 12b. The plate extension P is attached by recessed bolts B, and thus is removable for replacement if necessary due to wear. In addition, chain strippers T project from the face of the conveyor frame F and fit into the respective annular inner channels 14b (see FIG. 5) formed between the split teeth of the sprockets 14. These strippers T ensure that the chains are lifted from the seated position between the teeth 14a as the sprockets 14 guide the chain to the forward run.

The assembly 10 includes a pair of annular bearing housings 16 for supporting the ends of the idler shaft assembly 12. As perhaps best shown in FIGS. 2 and 3, the bearing housings 16 each include a central bore 18 adapted for receiving a bearing 22 for the respective ends of the idler shaft 12a. The bearings 22 are preferably tapered roller bearings that provide full rotational support for the shaft 12a.

The bearing housing 16 is integrally formed with a relatively wide projecting support arm 20. Spaced support brackets 24 for receiving the respective support arms 20 are attached to the conveyor frame F. These brackets 24 are C-shaped and include upper and lower flanges and a cross web which together define an open yoke. The rear face of the cross web is attached directly to a cross member 26 of the conveyor frame F, such as by welding or other secure attachment methods known in the art. Optionally, as illustrated in FIG. 5, the sides of brackets 24 may be attached to the support plates U projecting from the conveyor frame F. It should be appreciated that this does not make the shaft support assembly 10 dependent on the spacing of the sidewalls S or other fixed structures. This is because the spacing of the bearing housings 16 is defined by the location of the apertures in the brackets 24, and not the width of the brackets themselves. Thus, attaching the brackets 24 to the support plates U merely provides additional support and stability.

The open yoke of the C-shaped brackets 24 is sized for receiving and holding the support arms 20 in tight seating engagement. Specifically, the brackets 24 contact the support arms 20 on the top and bottom such that they are positioned outwardly from the face of the conveyor frame F to provide direct rotational support for the shaft assembly 12. As should be appreciated, the close fit between the support arms 20 and the brackets 24 provides stability as the rotating shaft assembly 12 is held in a cantilevered position from the end of the frame F. The close tolerances also prevent the support arms 20 from moving up and down in the brackets 24, which reduces shaft vibration. As best appreciated by viewing FIGS. 1 and 3 together, the support arms 20 are also relatively wide and thus resist bending forces created by the heavy gauge chain.

To ensure that the support arms 20 are held securely in the seated position in the respective brackets 24 and cannot shift from side to side, each includes vertically aligned apertures 30 for receiving fastener combinations or other securing means. These fastener combinations can take the form of bolts 32 and at least one dowel pin 34 to facilitate initial alignment of the apertures. Specifically, in the most preferred embodiment, three vertically aligned apertures 30 are provided. The rearmost of the apertures 30 is adapted for vertically receiving a dowel pin 34 having an oversized head and a tapered upper neck. The two forward apertures 30 are adapted to receive shoulder bolts 32.

Specifically during assembly, the dowel pin 34 is first inserted to bring the respective apertures 30 into alignment and to temporarily hold the bearing housings 16 in the brackets 24. Once registered in the rearmost vertically aligned apertures 30, each of the bolts 32 are inserted through the respective forward apertures 30 and the nut 32a is tightened onto the lower threaded end.

Both the heads of the bolts 32 and dowel pin 34 are preferably recessed in the topside of the upper flange of each C-shaped bracket 24. As shown in FIG. 4, the recess for the bolts includes sufficient clearance to allow a socket to be inserted on the head. As should be appreciated, recessing the bolts 32 and dowel pin 34 prevents the heads from interfering with the flight bars as the transition is made from the return run to the forward run. A similar recess is provided in the lower flange to also allow a socket to be placed over the nuts 32a.

As should be appreciated from viewing FIG. 1, the heads of the bolts 32 and the oversized head of the dowel pin 34 are fully accessible from above. By removing the respective nuts 32a and cotter pin 34a (if present) these fasteners 32, 34 may be lifted upwardly out of the respective apertures 30. Once the fasteners are removed, the shaft assembly 12 and bearing housings 16 can together as a unit be pulled horizontally out of the spaced support brackets 24. This easy release feature is beneficial because it lessens the production downtime required for accessing the shaft assembly 12, such as for replacement/servicing.

Another advantage of the easy release feature is that it allows the shaft assembly 12 to be quickly removed and reversed end over end to ensure that the components, including the teeth 14a on the sprockets 14, wear evenly. Specifically, it should be appreciated that the shaft 12a itself typically rotates only in one direction for a given period of time (as indicated by action arrow R in FIG. 4). The direction of rotation is dictated by the drive motor at the opposite end of the conveyor C. This eventually causes uneven wear between the leading and trailing faces on the teeth 14a. By removing the fasteners 32, 34, the shaft assembly 12 and bearing housings 16 may be pulled from the brackets 24 as a unit. The entire unit can be flipped end over end to reverse the shaft assembly 12. As should be appreciated, so reversing the shaft 12a effectively converts the former trailing faces of the sprocket teeth 14a into leading faces. By reversing the ends of the shaft 12a from time to time, wear on the sprocket teeth 14a is kept even, which extends the service life.

This reversing operation is also simplified by the shorter length of the shaft 12a. The sides S do not have to be shifted or removed and the effort required to lift the entire unit is reduced due to the lighter weight. The bearing housings 16 can remain in position on the ends of the shaft 12a during this operation. The symmetrical nature of the bearing housings 16 (see FIGS. 1 and 3) means that both can be interchanged between the brackets 24 while remaining fully functional and providing the desired tight seating engagement.

The proposed support assembly 10 is also advantageous because it moves the bearing housings 16 outward toward the ends of the shaft assembly 12. This arrangement reduces the effects of the deleterious twisting forces generated by the dual chains as they travel over the spaced inner sprockets 14.

In the preferred embodiment, caps 40 are installed on the outer ends of the annular bearing housings 16. These caps 40 provide additional protection for the ends of the rotating shaft 12a and serve to contain the lubricant present in the central bore 18.

To provide the desired rotational support for the shaft 12a, a bearing 22, such as for example a tapered roller bearing, is installed and housed in the central bore 18 of the bearing housing 16. As illustrated in the partial cutaway view in FIG. 5, a bearing retainer 42 is secured to the end of the shaft 12a. A ledge 18a (see FIGS. 2 and 3) formed in the bore 18 traps the bearing 22 at the opposite end.

At the inner end of each bearing housing 16, a spacer 44 is provided for insertion in the bore 18 (see FIG. 5). The spacer 44 mates with the inside face of the bearing housing 16. Double seals 48 are positioned adjacent to the spacer 44 and against an annular shoulder 18b formed in the bore 18 to prohibit contamination of lubricant and provide a method of purging old lubricant.

As should be appreciated, to reduce wear and maintain optimum operational efficiency, regular lubrication must be provided to the bearings. To ease the lubrication process, the annular bearing housings 16 also include passages 50 that allow lubricant to be supplied directly to the bearings 22. In the preferred embodiment, an L-shaped passage 50 is formed in the medial portion of each bearing housing 16 (FIG. 3). This passage 50 includes a feed orifice for receiving the end of the supply line of a lubrication system. The opposite end of the passage 50 opens into the central bore 18 (see FIG. 3). Of course, lubricant is forced through this passage 50. The radially extended passage 52 may also be provided in each housing 16 for pressure relief or other application and circulation of the lubricant. The outer bearing cap 40, spacer 44 and seals 48, ensure that the ends of shaft assembly 12 are fully contained and any lubricant introduced remains in an effective location in the bore 18. Of course, a grease fitting having a check valve and a nipple for receiving a conventional grease gun can be provided in one or both of the passages 50, 52.

In summary, many benefits and advantages can be realized by employing the shaft support assembly 10 of the present invention. In the operative position, the bearing housings 16 are held in a cantilevered fashion from the end face of the conveyor frame F. Support brackets 24 mounted to the end of the frame F provide full rotational support for the shaft assembly 12 inboard of the sidewalls S. The tight seating engagement provided between the support arms 20 and support brackets 24 ensures that the shaft assembly 12 is held in a secure and stable position. Positioning the bearing housings 16 at the ends of the shaft assembly 12 better resists deflection caused by the tremendous forces typically acting on the drive or idler shafts in scraper chain conveyors. Of course, the shorter shaft assembly 12 is also lighter, which reduces the effort necessary during maintenance or removal. The enhanced stability of the bearing housings 16 provided by the close tolerance fit between the top and bottom sides of the support brackets 24 and the support arms 20, reduces the vibration and twisting that would otherwise be experienced by the shaft assembly 12. The relatively wide support arms 20 also resist bending and flexing. Further, the easy release fastener combinations 32, 32a and 34, 34a are secured in vertically aligned apertures 30 extending through the support arms 20 and the brackets 24. These fastener combinations 32, 32a and 34, 34a also prevent any relative side to side movement. They are easily removed for dismounting the shaft assembly 12 and bearing housings 16 as a unit for servicing or repair (see the exploded perspective view of FIG. 1). Another advantage of this easy release feature is that it allows the shaft assembly 12 and housings 16 as a unit to be flipped end over end and reinserted in the brackets 24 to ensure even wear for the chain-engaging surfaces of the sprockets 14. This can accomplished without removing the annular bearing housings 16 from the ends of the shaft assembly 12, because the entire unit is symmetrical. To provide the desired continuous lubrication, the annular bearing housings 16 also include passages 50, 52 communicating with the center bore 18. Caps 40, spacers 44, and seals 48 provided at the ends of the bearing housings 16 ensure that any lubricant is contained and held at an effective location in the central bore 18, but allows purging of old lubricant.

The foregoing description of a preferred embodiment of the protective system of the present invention has been presented for purposes of illustration and description. It is not intended to be exhaustive or to limit the invention to the precise form disclosed. Obvious modifications or variations are possible in light of the above teachings. The embodiment described above for supporting an idler shaft assembly 12 was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An assembly for supporting a shaft carrying at least one sprocket for engaging a chain in an endless conveyor, said conveyor including a frame having an end face and spaced sidewalls, comprising:

a pair of spaced annular bearing housings for receiving and rotatably supporting the ends of the shaft, each of said bearing housings having an integral support arm;

a pair of spaced support brackets attached to the end face of the conveyor frame, each of said support brackets adapted to receive and hold a respective one of said support arms in tight seating engagement to prevent up and down movement and fully support the shaft independent of the sidewalls of the conveyor frame; and means for securing each of said support arms in said support brackets.

2. The shaft supporting assembly according to claim 1, wherein said pair of bearing housings and said pair of support brackets are provided with corresponding aligned vertical apertures for receiving said securing means.

3. The shaft supporting assembly according to claim 2, wherein said securing means includes at least one bolt that is inserted through and registers in said vertically aligned apertures to securely hold said support arms in place and prevent all movement relative to said support brackets.

4. The shaft supporting assembly according to claim 2, wherein said securing means includes at least one dowel pin inserted through and registering in said vertically aligned apertures to initially hold said support arms securely in place.

5. The shaft supporting assembly according to claim 1, wherein said support brackets are substantially C-shaped and include a rear cross web and an open yoke for receiving said support arms, said rear cross web attached to a cross member forming the end face of the conveyor frame.

6. The shaft supporting assembly according to claim 1, wherein each of said annular bearing housings includes a removable outer cap for containing the ends of the shaft.

7. The shaft support assembly according to claim 1, wherein each of said annular bearing housings include at least one passage extending into a central bore that houses a bearing for rotatably supporting an end of the shaft, whereby said passage allows for lubricant to be applied to the bearings or shaft.

8. The shaft supporting assembly according to claim 1, wherein each said support arm is at least as wide as said corresponding annular bearing housing.

9. An assembly for supporting a shaft carrying at least one sprocket for engaging the chain in a scraper chain conveyor, said conveyor having a frame with an end face and a pair of sidewalls, comprising:

a pair of annular bearing housings for receiving and rotatably supporting the ends of the shaft, each of said bearing housings having a support arm and being inboard of said sidewalls;

a pair of support brackets attached to the frame adjacent the end face of the conveyor frame, said brackets adapted to receive a corresponding support arm in tight seating engagement;

at least one fastener for fastening said bearing housings to said support brackets;

whereby said shaft is fully supported independent of the sidewalls of the conveyor frame by said bearing housings and said tight seating engagement of said support arms in said brackets.

10. The shaft supporting assembly according to claim 9, wherein said brackets are substantially C-shaped to form a yoke, and each includes a cross web for attachment to said end face of the conveyor frame and an open yoke for receiving and holding each said support arm in said tight seating engagement in the corresponding support bracket.

11. The shaft supporting assembly according to claim 9, wherein each of said annular bearing housings includes a removable outer retainer cap for containing the ends of the shaft.

12. The shaft support assembly according to claim 9 wherein each of said annular bearing housings include at least one passage extending into a central bore that houses a bearing for rotatably supporting an end of the shaft.

13. The shaft supporting assembly according to claim 9, wherein each said support arm is at least as wide as said corresponding annular bearing housing.

14. An endless conveyor for hauling aggregate material having a drive end unit including a drive shaft carrying at least one drive sprocket and an idler end, comprising:

a conveyor frame having a pair of sidewalls for supporting an upper deck, said sidewalls and upper deck defining a feed path for the aggregate material;

at least one chain for moving a plurality of spaced flight bars for conveying the aggregate material along the feed path, said chain being driven along the conveyor by said drive sprocket on said drive shaft;

an idler shaft carrying at least one sprocket for engaging and supporting said at least one chain at the idler end of the conveyor;

a pair of annular bearing housings for receiving and rotatably supporting each end of said shaft, each of said bearing housings having a support arm;

a pair of support brackets attached to said conveyor frame, said brackets adapted to receive and hold said support arms in tight seating engagement; and at least one fastener for fastening each of said support arms to a corresponding support bracket;

whereby said drive and idler shafts are fully supported independent of the sidewalls of the conveyor frame.

15. The endless conveyor according to claim 14, wherein each said support arm is at least as wide as said corresponding annular bearing housing.

* * * * *